US009096203B2

(12) United States Patent
Kim

(10) Patent No.: US 9,096,203 B2
(45) Date of Patent: Aug. 4, 2015

(54) BRAKE MASTER CYLINDER

(75) Inventor: Tae H. Kim, Pyeongtaek (KR)

(73) Assignee: MANDO CORPORATION, Pyeontaek-Si (KR)

( * ) Notice: Subject to any disclaimer, the term of this patent is extended or adjusted under 35 U.S.C. 154(b) by 374 days.

(21) Appl. No.: 13/620,678

(22) Filed: Sep. 14, 2012

(65) Prior Publication Data

US 2013/0086900 A1   Apr. 11, 2013

(30) Foreign Application Priority Data

Sep. 16, 2011   (KR) .................. 10-2011-0093447

(51) Int. Cl.
| | |
|---|---|
| B60T 11/16 | (2006.01) |
| B60T 7/04 | (2006.01) |
| B60T 7/08 | (2006.01) |
| B60T 17/22 | (2006.01) |

(52) U.S. Cl.
CPC ............... *B60T 11/16* (2013.01); *B60T 7/042* (2013.01); *B60T 7/085* (2013.01); *B60T 17/22* (2013.01)

(58) Field of Classification Search
CPC ......... F15B 15/28; B60T 11/16; B60T 17/22; B60T 7/085; B60T 7/042
USPC .......... 60/534, 545, 533, 562, 588, 400; 91/1; 92/5 R, 169.1
See application file for complete search history.

(56) References Cited

U.S. PATENT DOCUMENTS

| | | | |
|---|---|---|---|
| 3,938,333 A * | 2/1976 | Mathues ........................ | 60/574 |
| 4,914,916 A | 4/1990 | Leigh-Monstevens et al. | |
| 6,886,333 B2 * | 5/2005 | Feigel et al. .................... | 60/534 |
| 6,896,269 B2 * | 5/2005 | Jackson ........................ | 277/544 |
| 2004/0144611 A1 * | 7/2004 | Wolf et al. .................... | 192/48.2 |
| 2005/0103011 A1 * | 5/2005 | Nohira ........................... | 60/586 |
| 2007/0182403 A1 * | 8/2007 | von Hayn et al. ........ | 324/207.24 |

FOREIGN PATENT DOCUMENTS

| | | |
|---|---|---|
| CN | 1767974 A | 5/2006 |
| CN | 102022456 A | 4/2011 |
| DE | 10 2004 014 808 A1 | 11/2004 |
| KR | 10-2006-0006916 A | 1/2006 |

OTHER PUBLICATIONS

Chinese Office Action issued in Chinese Application No. 201210343282.6 dated Jul. 31, 2014.
Korean Office Action issued in Korean Patent Application No. KR 10-2011-0093447 dated Nov. 29, 2012.
German Office Action issued in German Patent Application No. DE 10 2012 018 134.5 dated Dec. 12, 2013.
Chinese Office Action issued in Chinese Application No. 201210343282.6 dated Mar. 13, 2015.

* cited by examiner

*Primary Examiner* — Nathaniel Wiehe
*Assistant Examiner* — Qi Gan
(74) *Attorney, Agent, or Firm* — McDermott Will & Emery LLP

(57) ABSTRACT

Disclosed is a brake master cylinder configured to sense a variation in magnetic flux in accordance with operation of a piston installed with a magnet, and thus to control activation of brake lamps. The brake master cylinder includes a cylinder body connected to a booster, first and second pistons to reciprocate in the cylinder body, a Hall sensor installed at an outside of the cylinder body, to sense operation of the pistons, for control of activation of brake lamps, a coupling shaft formed at an end of the second piston facing the first piston, and a magnet ring assembly installed at the coupling shaft such that the magnet ring assembly faces the Hall sensor. The magnet ring assembly includes a bushing centrally formed with a fitting hole to receive the coupling shaft, and a ring-shaped magnet fitted around the bushing, to exert magnetic force on the Hall sensor.

7 Claims, 5 Drawing Sheets

BRAKE MASTER CYLINDER

CROSS-REFERENCE TO RELATED APPLICATIONS

This application claims the benefit of Korean Patent Application No. P2011-93447, filed on Sep. 16, 2011 in the Korean Intellectual Property Office, the disclosure of which is incorporated herein by reference.

BACKGROUND

1. Field

Embodiments of the present invention relate to a brake master cylinder configured to sense variation in magnetic flux in accordance with operation of a piston installed with a magnet, and thus to control activation of brake lamps.

2. Description of the Related Art

Generally, a master cylinder for a brake of a vehicle receives force boosted in a booster using a pressure difference between vacuum and atmosphere, converts the received force into hydraulic pressure, and then transfers the hydraulic pressure to a wheel cylinder, to generate braking force.

Such a brake master cylinder is provided with a means to sense operation of a piston in order to turn on a lamp in accordance with the sensed result. FIG. 1 schematically shows a conventional brake master cylinder, which may control activation of brake lamps.

Referring to FIG. 1, the master cylinder 10 includes a piston 12 to be slidably moved in the master cylinder 10 by pedal pressure from a pedal (not shown). The piston 12 is formed with a groove 12a, in which a magnet 20 is mounted. A Hall sensor 30 is installed on an outside of a cylinder body 11 included in the master cylinder 10 at a position corresponding to the magnet 20.

The Hall sensor 30 includes a case 31 fixed to the outside of the cylinder body 11, a magnetic detector 33 attached to a base plate 32 disposed in the case 31, a control circuit 34 mounted to the base plate 32, to control the magnetic detector 33, and a lead wire 35 connected to the control circuit 34. The magnetic detector 33 includes a magnetoresistive element a Hall element, or a lead switch, which exhibits variation in resistance in accordance with variation in the intensity of a magnetic field sensed during movement of the piston 12. The Hall sensor 30, which has the above-mentioned configuration, turns on or off brake lamps through detection of the intensity of magnetic force corresponding to a moved position of the magnet 20 installed at the piston 12. This technology is well known in the technical field to which the technology pertains and, as such, no detailed description thereof will be given.

Meanwhile, due to the above-mentioned arrangement of the Hall sensor 30, the magnet 20 installed at the piston 12 should be disposed at a position where the magnet 20 faces the magnetic detector 33 in order to enable the Hall sensor 30, namely, the magnetic detector 33, to easily detect intensity of magnetic force.

In the above-mentioned conventional case, however, there is a problem in that the magnet 20 may be circumferentially spaced away from the magnetic detector 33 due to rotation of the piston 12 occurring during operation of the piston 12, so that the Hall sensor 30 may not reliably detect intensity of magnetic force. To solve this problem, there has been an attempt to install a ring-shaped magnet (not shown) at the piston 12. In this case, however, it may be impossible to assemble the ring-shaped solid magnet in a groove circumferentially formed at the piston 12.

In addition, installation of the ring-shaped magnet at the piston 12 may be possible when a flexible rubber magnet is used. However, such a rubber magnet is not practically employed because the magnetic force thereof is too weak to be detected by the Hall sensor 30.

SUMMARY

Therefore, it is an aspect of the present invention to provide a brake master cylinder configured to achieve easy installation of a ring-shaped magnet at a piston, thereby being capable of effectively supplying magnetic force to a Hall sensor even when the magnet rotates.

Another aspect of the present invention is to provide a brake master cylinder having an improved structure to achieve easy installation of a ring-shaped magnet at a piston.

Additional aspects of the invention will be set forth in part in the description which follows and, in part, will be obvious from the description, or may be learned by practice of the invention.

In accordance with one aspect of the present invention, a brake master cylinder, which includes a cylinder body connected to a booster, first and second pistons to reciprocate in the cylinder body, and a Hall sensor installed at an outside of the cylinder body, to sense operation of the pistons, for control of activation of brake lamps, further includes a coupling shaft formed at an end of the second piston facing the first piston, and a magnet ring assembly installed at the coupling shaft such that the magnet ring assembly faces the Hall sensor, wherein the magnet ring assembly includes a bushing centrally formed with a fitting hole extending in a longitudinal direction of the bushing such that the coupling shaft is fitted in the fitting hole, and a ring-shaped magnet fitted around an outer surface of the bushing, to exert magnetic force on the Hall sensor.

The bushing may include a cylindrical fitting portion centrally formed with the fitting hole, and a flange extending radially from an end of the fitting portion, to prevent separation of the magnet.

The fitting portion of the bushing may be formed with at least one vent hole extending in the longitudinal direction, to exhaust air existing between the bushing and the second piston.

The magnet ring assembly may further include washers made of a steel material and fitted around the bushing at opposite sides of the magnet, respectively, to concentrate magnetic flux of the magnet.

The magnet ring assembly may further include a sealing member fitted around the bushing, to be in close contact with the end of the second piston.

The sealing member may be formed, at a lateral surface thereof contacting the end of the second piston, with at least one air passage extending through inner and outer circumferential surfaces of the sealing member, to allow air to flow through the sealing member. The at least one air passage includes a plurality of air passages uniformly spaced along a circumference of the sealing member.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
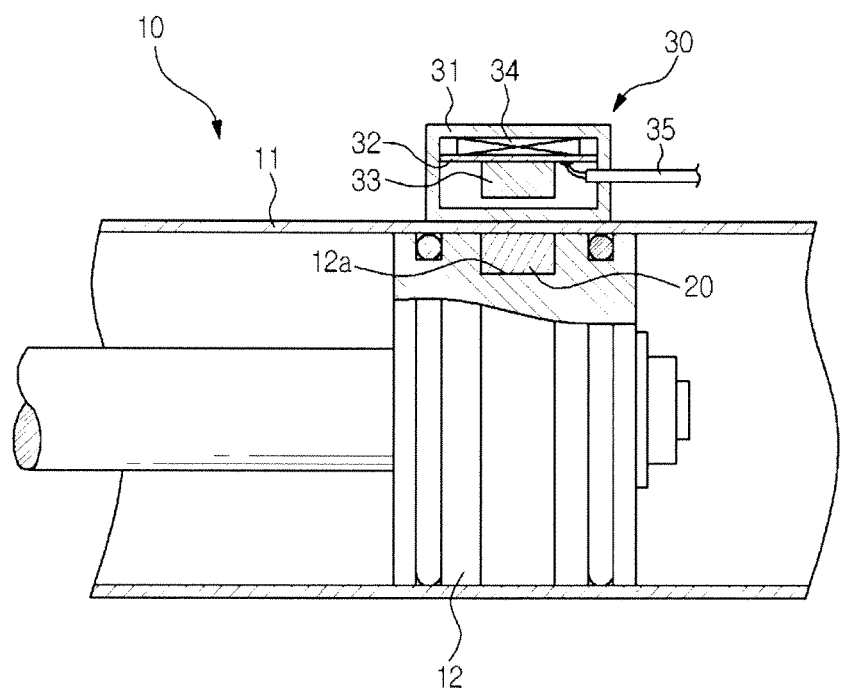
FIG. 1 is a sectional view schematically illustrating a conventional brake master cylinder.

Reference will now be made in detail to the preferred embodiments of the present invention, examples of which are illustrated in the accompanying drawings. It should be understood that the terms used in the specification and appended claims should not be construed as limited to general and dictionary meanings but should be construed based on the meanings and concepts according to the spirit of the present invention on the basis of the principle that the inventor is permitted to define appropriate terms for best explanation. The preferred embodiments described in the specification and shown in the drawings are only illustrative and are not intended to represent all aspects of the invention, such that various equivalents and modifications may be made without departing from the spirit of the invention.

Figure 2:
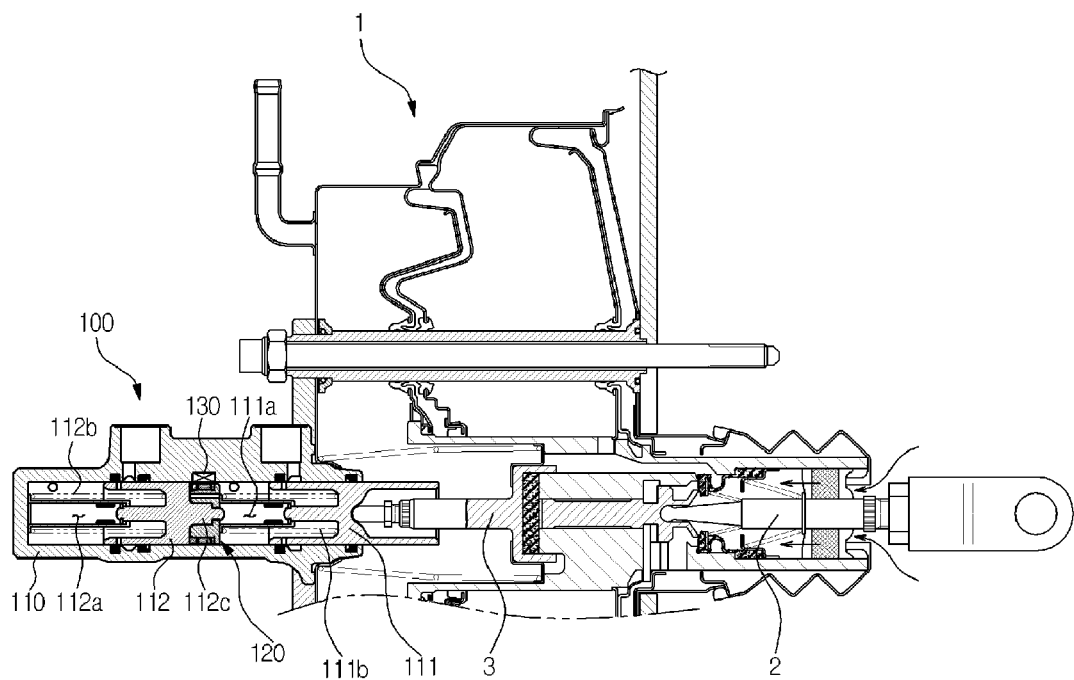
FIG. 2 is a sectional view schematically illustrating a brake master cylinder according to an exemplary embodiment of the present invention.
Figure 3:
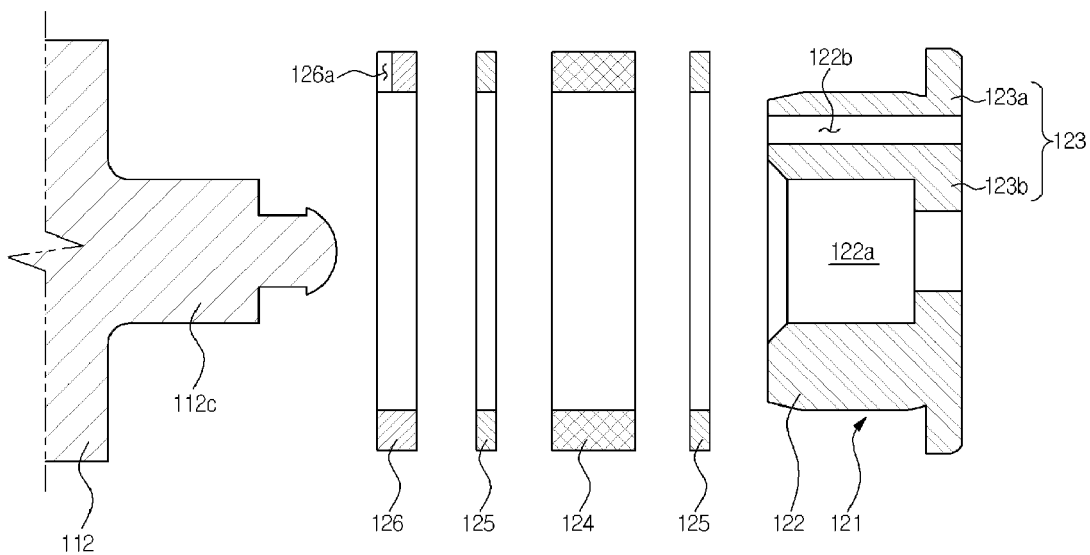
FIG. 3 is an exploded sectional view illustrating an installed state of a magnet ring assembly included in the brake master cylinder according to the illustrated embodiment of the present invention.
Figure 4:
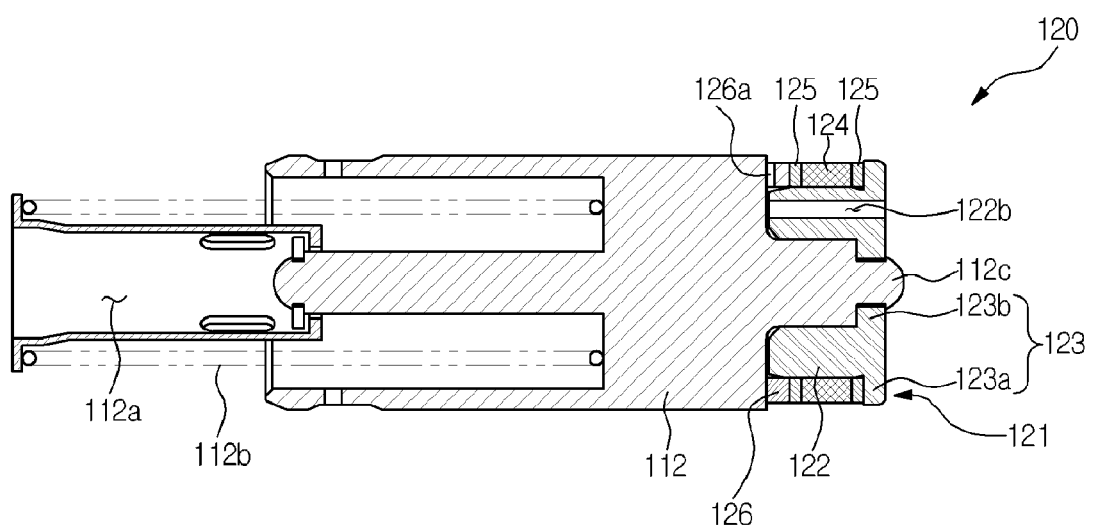
FIG. 4 is an assembled sectional view corresponding to FIG. 3.

FIG. 2 is a sectional view schematically illustrating a brake master cylinder according to an exemplary embodiment of the present invention. FIG. 3 is an exploded sectional view illustrating an installed state of a magnet ring assembly included in the brake master cylinder. FIG. 4 is an assembled sectional view corresponding to FIG. 3.

Referring to FIGS. 2 to 4, the brake master cylinder according to the illustrated embodiment of the present invention, which is designated by reference numeral "100", includes a cylindrical cylinder body 110 opened at one end thereof while being closed at the other end thereof. The brake master cylinder also includes first and second pistons 111 and 112 disposed in the cylinder body 110, to slide in accordance with operation of a brake pedal (not shown) by the user, a magnet ring assembly 120 installed at the second piston 112, and a Hall sensor 130 mounted to an outside of the cylinder body 110, to detect magnetic force.

An oil reservoir tank (not shown) is installed above the brake master cylinder 100, to supply oil to the master cylinder 100. The master cylinder 100 is connected, at one end thereof, to a booster 1 to boost force applied to the brake pedal. In the illustrated case, the brake master cylinder 100 operates such that a pressure difference generated in accordance with an input shaft 2 linked to the brake pedal (not shown) is transmitted to an output shaft 3 which, in turn, pushes the pistons 111 and 112, to transmit hydraulic pressure to a wheel cylinder (not shown), and thus to generate braking force.

A first hydraulic chamber 111a, in which hydraulic pressure is generated, is formed in the cylinder body 110 between the first piston 111 and the second piston 112. A second hydraulic chamber 112a, in which hydraulic pressure is generated, is formed in the cylinder body 110 between the second piston 112 and the other end of the cylinder body 110. A first return spring 111b and a second return spring 112b are disposed in the hydraulic chambers 111a and 112a, to return the first piston 111 and second piston 112, respectively. Such a structure of the master cylinder 100 is well known and, as such, no detailed description thereof will be given.

In accordance with the illustrated embodiment of the present invention, the Hall sensor 130 is provided to control activation of brake lamps in accordance with the above-described operations of the pistons 111 and 112 of the master cylinder 100. Also, a magnet ring assembly 120 is provided to transmit magnetic force of a magnet 124 to the Hall sensor 130. The Hall sensor 130 is fixedly mounted to the outside of the cylinder body 110. The magnet ring assembly 120 is installed at one of the first and second pistons 111 and 112 such that it faces the Hall sensor 130. The following description will be given in conjunction with the case in which the magnet ring assembly 120 is installed at the second piston 112. Of course, the magnet ring assembly 120 may be selectively installed at the first piston 111 as long as the magnet ring assembly 120 may face the Hall sensor 130. In order to enable installation of the magnet ring assembly 120, the second piston 112 is formed with a coupling shaft 112c at a rear end thereof, namely, an end thereof facing the first piston 111.

Meanwhile, the Hall sensor 130, which is mounted to the outside of the cylinder body 110, includes a magnetic detector (not shown) to detect magnetic force of the magnet 124 in order to sense displacement of magnetic flux occurring due to movement of the second piston 112, for control of activation of brake lamps. Such a configuration of the Hall sensor 130 is well known and is identical to that of the Hall sensor (cf. "30" in FIG. 1) described in conjunction with the related art and, as such, no detailed description thereof will be given.

The magnet ring assembly 120 according to the illustrated embodiment of the present invention includes a bushing 121 to be fitted around the coupling shaft 112c, and a ring-shaped magnet 124 to be fitted around the bushing 121.

The bushing 121 is centrally formed with a fitting hole 122a extending in a longitudinal direction of the bushing 121, to receive the coupling shaft 112c. In more detail, the bushing 121 includes a cylindrical fitting portion 122 centrally formed with the fitting hole 122a, and a flange 123 formed at one end of the fitting portion 122 such that it extends radially, to prevent the magnet 124 from being separated from the bushing 121.

The fitting portion 122 has a predetermined thickness, and is formed with at least one vent hole 122b extending in the longitudinal direction, to allow air between the bushing 121 and the second piston 112 to be outwardly exhausted when the bushing 121 is fitted around the coupling shaft 112c of the second piston 112. After fitting of the bushing 121 installed with the magnet 124, a process for sealing a gap between the bushing 121 and the second piston 112 is carried out. The vent hole 122b is adapted to smoothly exhaust air between the bushing 121 and the second piston 112 during the sealing process. That is, if there is air between the bushing 121 and the second piston 112, error may be generated in the braking system. To this end, air is exhausted through the vent hole 122b.

Meanwhile, the fitting hole 122a formed at the fitting portion 122 has a shape corresponding to an outer shape of the coupling shaft 112c, to be tightly fitted around the second piston 112. That is, the fitting hole 122a has a stepped shape corresponding to a stepped shape of the coupling shaft 112c, as shown in FIG. 3.

The flange 123 includes a first flange 123a extending radially outwardly from one end of the fitting portion 122, and a second flange 123b extending radially inwardly from the end of the fitting portion 122. The first flange 123a functions to prevent the magnet 124 fitted around the fitting portion 122 from being separated from the fitting portion 122. The second flange 123b causes the fitting hole 122a to have a stepped structure. When the fitting hole 122a is fitted around the coupling shaft 112c, the second flange 123b is forcibly fitted around the coupling shaft 112c, thereby maintaining firm coupling of the bushing 121.

The ring-shaped magnet 124 is fitted around an outer surface of the fitting portion 122. The magnet 124 installed at the second piston 112 via the bushing 121 should be disposed at a position facing the magnetic detector (not shown) of the Hall sensor 130 in order to accurately sense movement of the second piston 112. In accordance with the illustrated embodiment of the present invention, the ring-shaped solid magnet 124 may be easily installed in place at the second piston 112 via the bushing 121, and the Hall sensor 130 may easily and stably detect magnetic force even when the second piston 112 rotates during operation thereof.

In accordance with an embodiment of the present invention, the magnet ring assembly 120 also includes a washer 125 fitted around the fitting portion of the bushing 121. In the illustrated embodiment, a pair of washers 125 is installed at opposite sides of the magnet 124. The washers 125 are made of a steel material, and are installed to be in close contact with the opposite sides of the magnet 124, to concentrate magnetic flux of the magnet 124. In accordance with this structure of the magnet 124 with the washers 125, it may be possible to enhance detection degree of the Hall sensor 130, as compared to a conventional case in which a magnet exhibiting the same magnetic force as the magnet 124 is only used.

Figure 5:
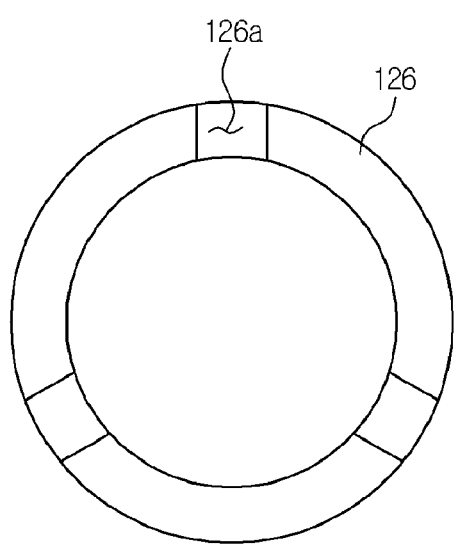
FIG. 5 is a view illustrating a sealing member included in the magnet ring assembly of the brake master cylinder according to the illustrated embodiment of the present invention.

In accordance with an embodiment of the present invention, the magnet ring assembly 120 further includes a sealing member 126 fitted around an outer surface of the bushing 121 while being in close contact with an end of the second piston 112. In more detail, as shown in FIG. 5, the sealing member 126 has an O-ring shape. The sealing member 126 is formed with an air passage 126a extending through inner and outer circumferential surfaces of the sealing member 126 to allow air to pass through the sealing member 126, at one lateral surface of the sealing member 126 contacting the end of the second piston 112. The air passage 126a is adapted to easily exhaust air existing between the bushing 121 and the second piston 112. That is, the air passage 126a has the same function as the vent hole 122b formed at the bushing 121 and, as such, no detailed description thereof will be given. In accordance with the illustrated embodiment, a plurality of air passages 126a is formed to be uniformly spaced along a circumference of the sealing member 126.

Hereinafter, operation of the brake master cylinder having the above-described configuration according to the illustrated embodiment of the present invention will be described with reference to the drawings.

When the driver steps on the brake pedal (not shown), for braking operation, the first piston 111 of the master cylinder 100 is forwardly moved in accordance with operation of the booster 1. As a result, oil in the sealed first hydraulic chamber 111a is compressed, thereby causing the second piston 112 to be forwardly moved in link with compression of the oil. In accordance with the forward movement of the second piston 112, oil in the second hydraulic chamber 112a is compressed. In this state, the first return spring 111b and second return spring 112b, which are disposed in front of the first piston 111 and second piston 112, respectively, are compressed during forward movement of the first piston 111 and second piston 112. When the force applied to the brake pedal is released, the pistons 111 and 112 are returned by resilience of the return springs 111b and 112b.

Such movements of the pistons 111 and 112 are sensed by the Hall sensor 130 installed at the outside of the cylinder body 110. That is, when the magnet 124 installed at the second piston 112 is moved together with the second piston 112, magnetic flux acting on the magnetic detector (not shown) of the Hall sensor 130 is reduced. This magnetic flux reduction is detected by the Hall sensor 130 which, in turn, turns on the brake lamps. That is, when braking operation is carried out in accordance with movement of the second piston 112, the brake lamps are turned on. Also, when the pistons 111 and 112 are returned to original positions thereof, magnetic flux exerting on the magnetic detector increases, thereby causing the Hall sensor 130 to turn off the brake lamps.

Thus, in accordance with the illustrated embodiment, detection of magnetic force at very high accuracy is achieved because magnetic flux of high density acts on the magnetic detector by virtue of the washers 125 when the magnet 124 is positioned to face the magnetic detector, whereas magnetic flux acting on the magnetic detector is abruptly reduced even when the magnet 124 slightly shifts the position facing the magnetic detector. Since the Hall sensor 130 has an enhanced detection degree, it may accurately detect positions of the pistons 111 and 112 without operating erroneously.

As apparent from the above description, in the brake master cylinder according to the embodiment of the present invention, the ring-shaped solid magnet is fitted around the bushing which is, in turn, installed at the piston. Thus, there is an effect of easily mounting the magnet to the piston. Accordingly, the Hall sensor may easily and stably detect intensity of magnetic force even when the piston rotates during operation thereof. Thus, control of activation of the brake lamps may be reliably achieved.

Also, in accordance with installation of the washers made of a steel material at opposite sides of the magnet, it may be possible to stably fix the magnet and to concentrate magnetic flux of the magnet. Accordingly, it may be possible to enhance the detection degree of the Hall sensor, as compared to a conventional case in which a magnet exhibiting the same magnetic force as the magnet is used.

In addition, the vent hole is formed at the bushing or the air passages are formed at the sealing member in order to exhaust air between the piston and the bushing upon sealing a gap between the bushing and the piston after installation of the magnet. Accordingly, it may be possible to prevent failure of the braking system due to air between the piston and the bushing.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A brake master cylinder comprising a cylinder body connected to a booster, first and second pistons to reciprocate in the cylinder body, and a Hall sensor installed at an outside of the cylinder body, to sense operation of the pistons, for control of activation of brake lamps, further comprising:
    a coupling shaft formed at an end of the second piston facing the first piston; and
    a magnet ring assembly installed at the coupling shaft such that the magnet ring assembly faces the Hall sensor,
    wherein the magnet ring assembly comprises:
    a bushing centrally formed with a fitting hole extending in a longitudinal direction of the bushing such that the coupling shaft is fitted in the fitting hole; and
    a ring-shaped magnet fitted around an outer surface of the bushing, to exert magnetic force on the Hall sensor, wherein the bushing comprises a cylindrical fitting portion centrally formed with the fitting hole and formed with at least one vent hole extending in the longitudinal direction of the bushing to exhaust air existing between the bushing and the second piston.

2. The brake master cylinder according to claim 1, wherein the bushing further comprises a flange extending radially from an end of the fitting portion, to prevent separation of the magnet.

3. The brake master cylinder according to claim 1, wherein the magnet ring assembly further comprises washers made of a steel material and fitted around the bushing at opposite sides of the magnet, respectively, to concentrate magnetic flux of the magnet.

4. The brake master cylinder according to claim 1, wherein the magnet ring assembly further comprises a sealing member fitted around the bushing, to be in close contact with the end of the second piston.

5. The brake master cylinder according to claim 4, wherein the sealing member is formed, at a lateral surface thereof contacting the end of the second piston, with at least one air passage extending through inner and outer circumferential surfaces of the sealing member, to allow air to flow through the sealing member.

6. The brake master cylinder according to claim 5, wherein the at least one air passage comprises a plurality of air passages uniformly spaced along a circumference of the sealing member.

7. The brake master cylinder according to claim 1, wherein the fitting hole is forcibly fitted around the coupling shaft.

* * * * *